United States Patent
Okamura

(10) Patent No.: US 8,600,597 B2
(45) Date of Patent: Dec. 3, 2013

(54) ELECTRIC VEHICLE

(75) Inventor: Masaki Okamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 263 days.

(21) Appl. No.: 13/112,521

(22) Filed: May 20, 2011

(65) Prior Publication Data

US 2011/0288706 A1 Nov. 24, 2011

(30) Foreign Application Priority Data

May 24, 2010 (JP) ................................ 2010-118012

(51) Int. Cl.
*B60W 10/06* (2006.01)
*G06F 19/00* (2011.01)

(52) U.S. Cl.
USPC ........................................... 701/22; 318/139

(58) Field of Classification Search
USPC ...................... 701/22; 318/434, 269, 139, 66
See application file for complete search history.

(56) References Cited

U.S. PATENT DOCUMENTS

| 5,345,155 A * | 9/1994 | Masaki et al. ............ 318/400.07 |
| 7,245,094 B2 * | 7/2007 | Shinmura et al. .............. 318/139 |
| 8,169,177 B2 * | 5/2012 | Kishimoto ..................... 318/490 |

FOREIGN PATENT DOCUMENTS

| CN | 1807146 A | 7/2006 |
| JP | A-2007-325352 | 12/2007 |
| JP | A-2008-254677 | 10/2008 |

* cited by examiner

*Primary Examiner* — Tan Q Nguyen
(74) *Attorney, Agent, or Firm* — Oliff & Berridge, PLC

(57) ABSTRACT

An electric vehicle includes a synchronous motor that outputs torque to a first driving wheel; an induction motor that outputs torque to a second driving wheel; and an output torque changing portion that makes the synchronous motor torque smaller than the induction motor torque when torque is output to the first or second driving wheel and the vehicle speed is close to zero, and makes the synchronous motor torque larger than the induction motor torque when torque is output to the first or second driving wheel and the vehicle is moving at or greater than a predetermined speed in a direction opposite a direction in which the vehicle is being operated to move, by the torque output to the first and second driving wheels.

8 Claims, 7 Drawing Sheets

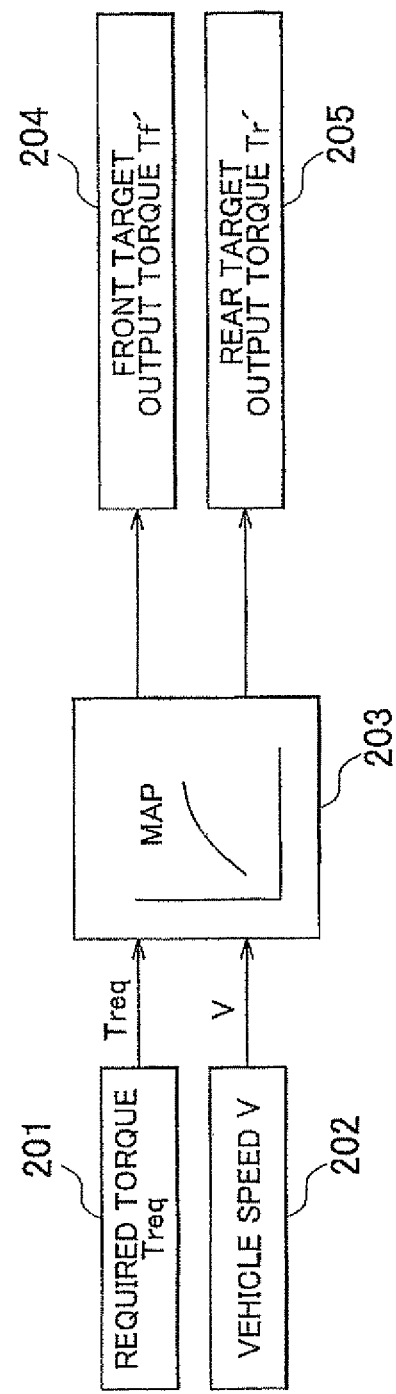

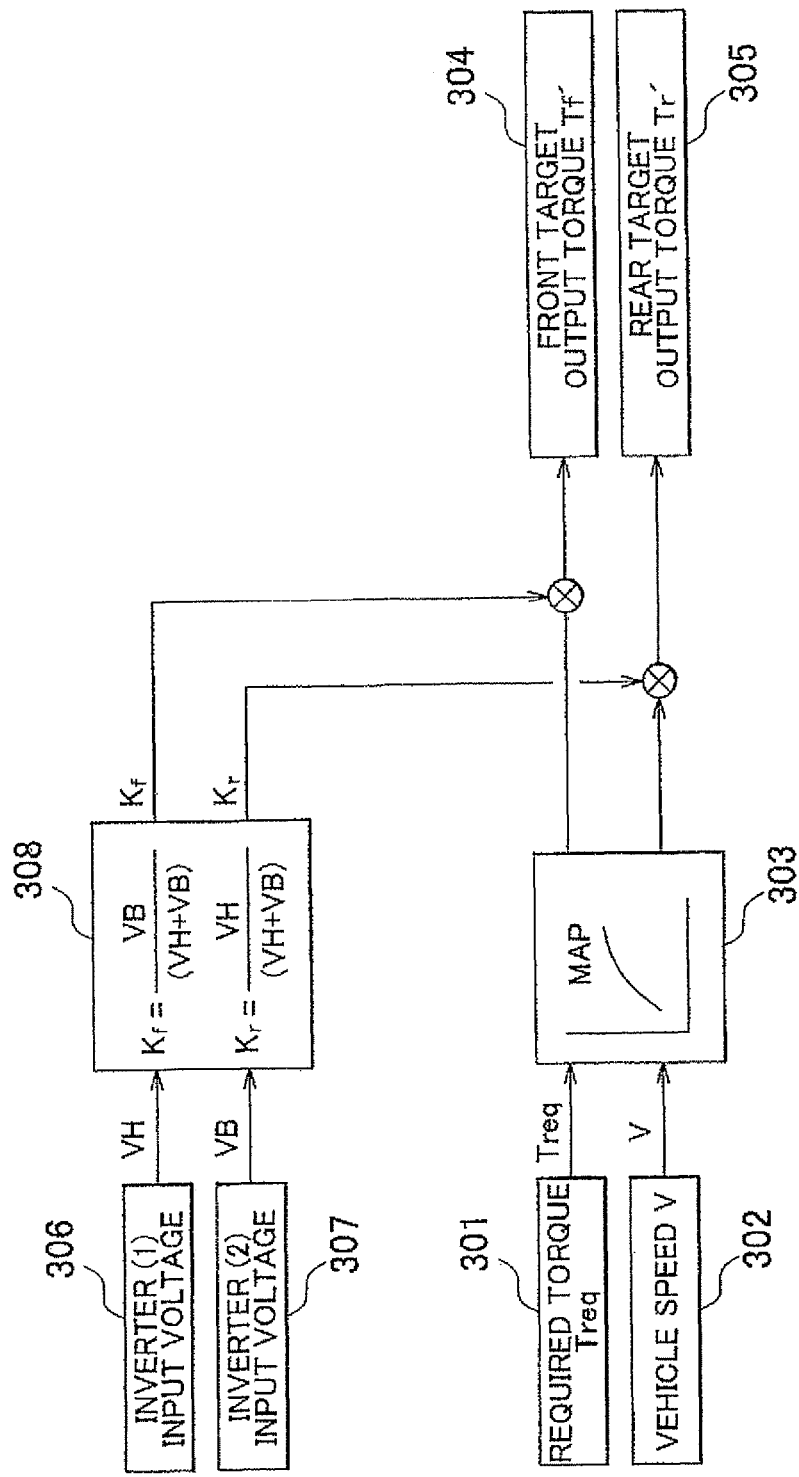

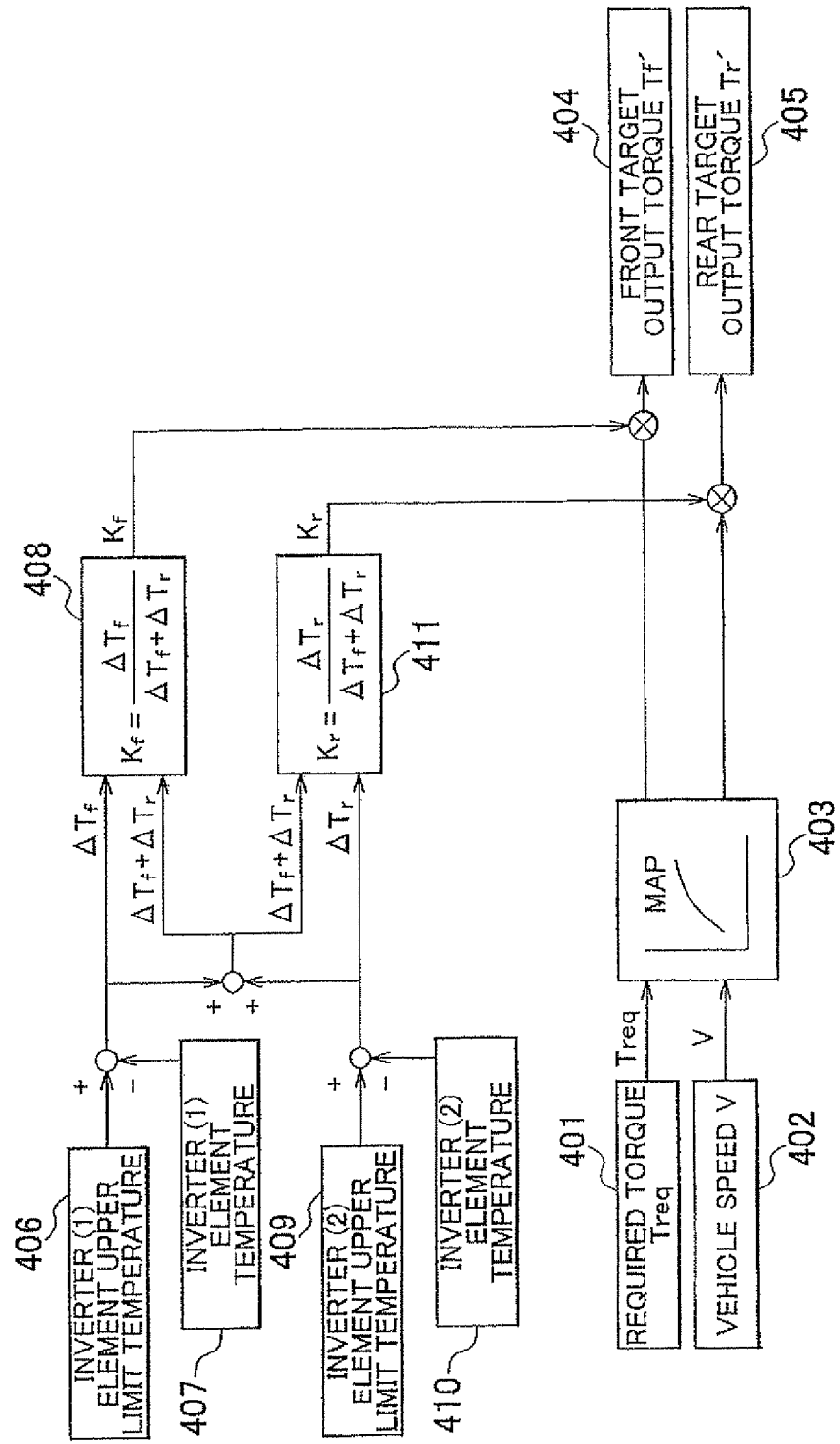

ELECTRIC VEHICLE

INCORPORATION BY REFERENCE

The disclosure of Japanese Patent Application No. 2010-118012 filed on May 24, 2010 including the specification, drawings and abstract is incorporated herein by reference in its entirety.

BACKGROUND OF THE INVENTION

1. Field of the Invention

The invention relates to the structure of an electric vehicle.

2. Description of Related Art

Vehicles powered partially or entirely by electricity, such as hybrid vehicles that are driven by an engine and an electric motor and electric vehicles that are driven by an electric motor, (hereinafter these types vehicles will simply be referred to as electric vehicles) have come to be widely used. Such vehicles are often configured to use either the front wheels or the rear wheels as driving wheels. However, some of these vehicles are four-wheel drive vehicles that use both the front wheels and the rear wheels as the driving wheels. More specifically, with a four-wheel drive electric vehicle, either the front wheels or the rear wheels are used as the main driving wheels, and the other wheels are used as the auxiliary driving wheels. The main driving wheels are often driven by a synchronous electric motor (hereinafter simply referred to as "synchronous motor") in which permanent magnets are used in the rotor. On the other hand, the auxiliary driving wheels sometimes serve as driving wheels that drive the vehicle and at other times serve as driven wheels that do not output force to drive the vehicle. Therefore, a configuration is often employed in which, when the auxiliary driving wheels serve as driven wheels, they are driven by an induction electric motor (hereinafter simply referred to as "induction motor") that does not use permanent magnets in the rotor, in order to suppress the generation of cogging torque caused by whirling of the rotor of the synchronous motor that uses permanent magnets, and an increase in running resistance, that keep the fuel efficiency of the vehicle from being able to improve (see Japanese Patent Application Publication No. 2007-325352 (JP-A-2007-325352), for example).

Further, with an induction motor that does not use permanent magnets, energy loss is large in the low torque output range. Therefore, in an electric vehicle provided with both a synchronous motor that uses permanent magnets in the rotor and an induction motor that does not use permanent magnets, a proposal has been made to increase the energy efficiency of the vehicle by outputting just enough torque from the main driving wheels to compensate for the mechanical loss of the auxiliary driving wheels when the power output to the auxiliary driving wheels is in the low output range (see Japanese Patent Application Publication No. 2008-254677 (JP-A-2008-254677)).

Incidentally, with a synchronous motor that drives the main driving wheels, direct current (DC) power is converted into alternating current (AC) power by an inverter, and a rotor that uses permanent magnets is rotated at a speed synchronized with the rotation speed of a rotating magnetic field generated in a stator by the AC power. Therefore, if the speed of the vehicle is low, the rotation speed of the rotating magnetic field or the frequency of the AC power is low. On the other hand, the torque output from the rotor depends on the amount of current flowing to the electric motor. Therefore, when the frequency of the AC power flowing to the synchronous motor is low and a large amount of current is applied to obtain a large amount of torque, such as when climbing a steep hill at a low speed, the ON/OFF cycle of switching elements of the phases of the inverter may become longer, so the time during which a large amount of current flows to the switching element of a single phase may become longer, and as a result, the temperature of the switching element may rise. In particular, if the vehicle is stopped on a hill and kept in place by the accelerator being depressed (i.e., what will hereinafter be referred to as an accelerator hold state), the frequency of the AC power flowing to the synchronous motor will end up becoming zero, so the switching element of one phase will be continuously on so the temperature of that switching element will rise. However, there is no mention or suggestion of a rise in temperature of the switching element at low vehicle speeds or in an accelerator hold state.

SUMMARY OF THE INVENTION

The invention provides an electric vehicle capable of suppressing a rise in temperature of a switching element of an inverter.

One aspect of the invention relates to an electric vehicle that includes a synchronous electric motor that outputs torque to a first driving wheel, an induction electric motor that outputs torque to a second driving wheel, a first inverter that converts first direct current power to alternating current power for driving the synchronous electric motor, a second inverter that converts second direct current power to alternating current power for driving the induction electric motor, a vehicle speed sensor that detects a vehicle speed, and a control portion that controls the torque output from the synchronous electric motor and the torque output from the induction electric motor. The control portion includes an output torque changing portion that makes the torque output from the synchronous electric motor smaller than the torque output from the induction electric motor when torque is output to the first driving wheel or the second driving wheel and the vehicle speed is close to zero, and that makes the torque output from the synchronous electric motor larger than the torque output from the induction electric motor when torque is output to the first driving wheel or the second driving wheel and the vehicle is moving at or greater than a predetermined speed in a direction opposite a direction in which the vehicle is being operated to move, by the torque output to the first driving wheel and the second driving wheel.

With the electric vehicle in this aspect, it is possible to suppress a rise in temperature of a switching element of an inverter.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a control logic diagram of the hybrid vehicle according to the example embodiment of the invention;

FIG. 5 is a control logic diagram of the hybrid vehicle according to another example embodiment of the invention;

FIG. 7 is a control logic diagram of the hybrid vehicle according to yet another example embodiment of the invention.

DETAILED DESCRIPTION OF EMBODIMENTS

Figure 1:
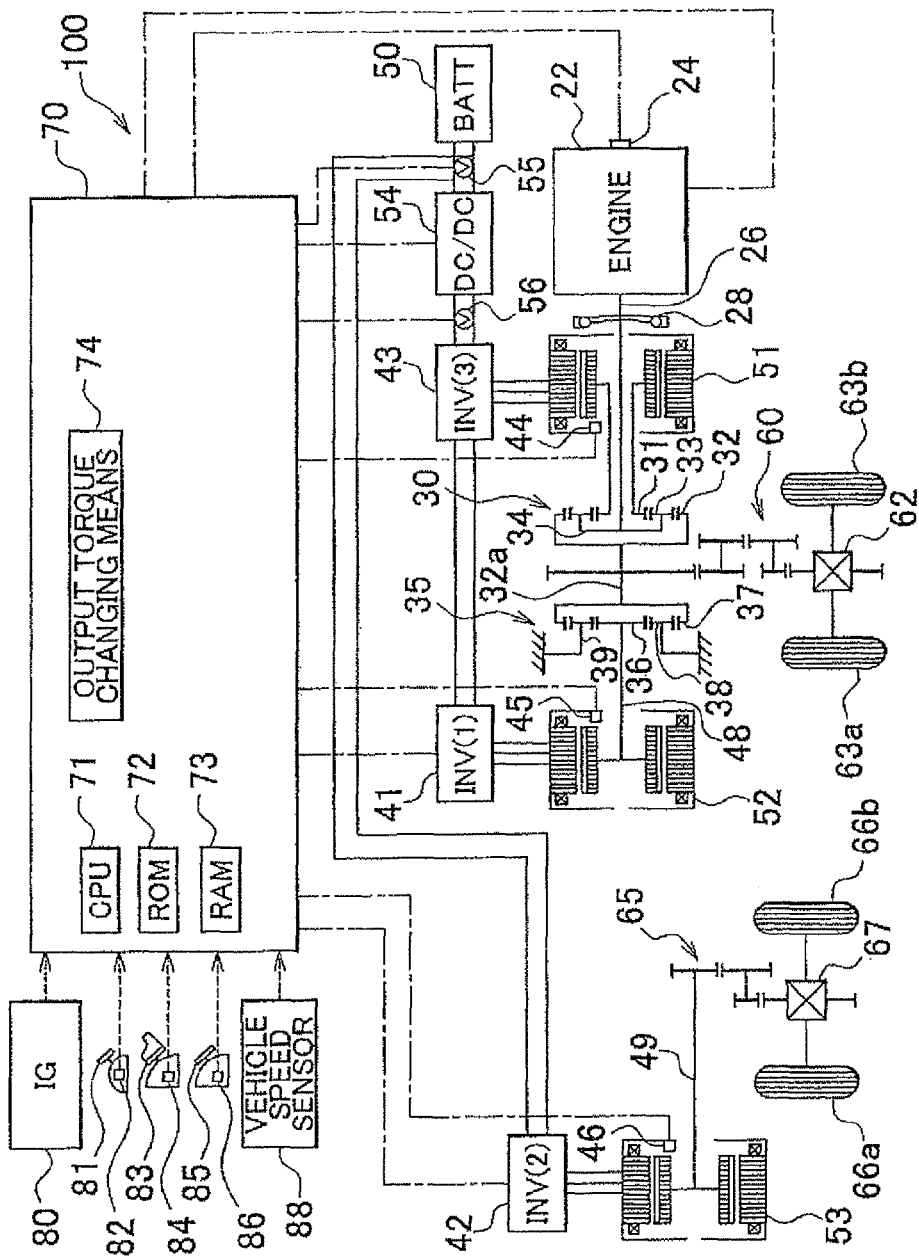
FIG. 1 is a system diagram showing the configuration of a hybrid vehicle according to one example embodiment of the invention.

Hereinafter, example embodiments in which the invention has been applied to a hybrid vehicle, that is one type of electric vehicle, will be described. As shown in FIG. 1, a hybrid vehicle 100 in this example embodiment is provided with an engine 22, a three-shaft planetary gear set 30 that is connected via a damper 28 to a crankshaft 26 that serves as an output shaft of the engine 22, a generator 51 that is connected to the planetary gear set 30, a reduction gear 35 that is mounted on a ring gear shaft 32a that is a drive shaft of front driving wheels 63a and 63b that is connected to the planetary gear set 30, a synchronous motor 52 that is connected to this reduction gear 35, an induction motor 53 that drives rear driving wheels 66a and 66b, a battery 50 that is a secondary battery that can be charged and discharged, and a control portion 70.

The planetary gear set 30 includes a sun gear 31 that is a gear with external teeth, a ring gear 32 that is a gear with internal teeth that is arranged concentric with the sun gear 31, a plurality of pinion gears 33 that are in mesh with both the sun gear 31 and the ring gear 32, and a carrier 34 that rotatably and revolvably retains the plurality of pinion gears 33. The planetary gear set 30 performs a differential operation with the sun gear 31, the ring gear 32, and the carrier 34 as the rotating elements. The planetary gear set 30 is configured such that the crankshaft 26 of the engine 22 is connected to carrier 34, the generator 51 is connected to the sun gear 31, and the reduction gear 35 is connected, via the ring gear shaft 32a that serves as a power output shaft for driving the vehicle, to the ring gear 32. The planetary gear set 30 distributes the power from the engine 22 that is input from the carrier 34 to the sun gear 31 side and the ring gear 32 side according to the gear ratio of sun gear 31 and the ring gear 32. The power output from the ring gear 32 is output from the ring gear shaft 32a to the front driving wheels 63a and 63b that serve as first driving wheels, via a front gear mechanism 60 and a front differential gear 62.

The reduction gear 35 is configured to be able to reduce the rotation speed input from a rotating shaft 48 of the synchronous motor 52, and output that reduced rotation speed to the ring gear shaft 32a. The reduction gear 35 is configured as a planetary gear set and includes a sun gear 36 that is a gear with external teeth, a ring gear 37 that is a gear with internal teeth that is arranged concentric with the sun gear 36, a plurality of pinion gears 38 that are in mesh with both the sun gear 36 and the ring gear 37, and a carrier 39 that rotatably and revolvably retains the plurality of pinion gears 38. The rotating shaft 48 of the synchronous motor 52 is connected to the sun gear 36 of the reduction gear 35, and the ring gear shaft 32a is connected to the ring gear 37. Also, the carrier 39 is fixed to a case and is thus held stationary.

Further, a rotating shaft 49 of the induction motor 53 that drives the rear driving wheels 66a and 66b of the hybrid vehicle 100 outputs power to the rear driving wheels 66a and 66b that serve as second driving wheels, via a rear gear mechanism 65 and a rear differential gear 67.

The generator 51 and the synchronous motor 52 have permanent magnets embedded in their rotors. The induction motor 53 does not have permanent magnets in its rotor. The synchronous motor 52 receives driving power from a first inverter 41 that receives high voltage VH that is voltage from the battery 50 that has been stepped up by a step-up converter 54. The high voltage power generated by the generator 51 is stepped down by a third inverter 43 and stored in the battery 50. A voltage sensor 55 that detects a voltage VB of the battery 50 is provided on an output terminal of the battery 50, and a voltage sensor 56 that detects the stepped-up voltage VH is provided on an output terminal of the step-up converter 54. Also, the induction motor 53 receives driving power from a second inverter 42 that receives the voltage VB directly from the battery 50. Each of the inverters 41, 42, and 43 has a switching element inside. Direct current (DC) power is converted to three-phase alternating current (AC) power and three-phase AC power is converted to DC power by switching these switching elements on and off.

The control portion 70 is a computer that includes a CPU 71 that processing signals, ROM 72 in which processing programs are stored, RAM 73 that temporarily stores data, and output torque changing means 74. The control portion 70 receives various signals via an input port. Some of these signals include an ignition signal from an ignition switch 80, a signal indicative of a shift position SP from a shift position sensor 82 that detects the shift position of a shift lever 81, a signal indicative of an accelerator operation amount Acc from an accelerator pedal position sensor 84 that detects a depression amount of an accelerator pedal 83, a signal indicative of a brake pedal position BP from a brake pedal position sensor 86 that detects a depression amount of a brake pedal 85, and a signal indicative of a vehicle speed V from a vehicle speed sensor 88. Also, the engine 22, the inverters 41, 42, and 43, and the step-up converter 54 are all connected to the control portion 70 and are driven by commands from the control portion 70. The control portion 70 also receives signals indicative of the temperatures of the switching elements of the inverters 41, 42, and 43. A crankshaft rotational position sensor 24 that is mounted to the engine 22 and detects the rotational position of the crankshaft 26 of the engine 22, as well as rotor position detecting sensors 44, 45, and 46 that are mounted to the generator 51, the synchronous motor 52, and the induction motor 53, respectively, are also connected to the control portion 70, and the control portion 70 receives a signal indicative of the speed of the engine 22, and signals indicative of the positions of the rotors of the generator 51, the synchronous motor 52, and the induction motor 53. The battery 50 is also connected to the control portion 70, and the control portion 70 receives data such as the temperature of the battery 50. The voltage sensor 55 at the output terminal of the battery 50 and a voltage sensor 56 at the output terminal of the step-up converter 54 are also both connected to the control portion 70, and the control portion 70 receives signals indicative of the voltages VH and VB.

Figure 2A:
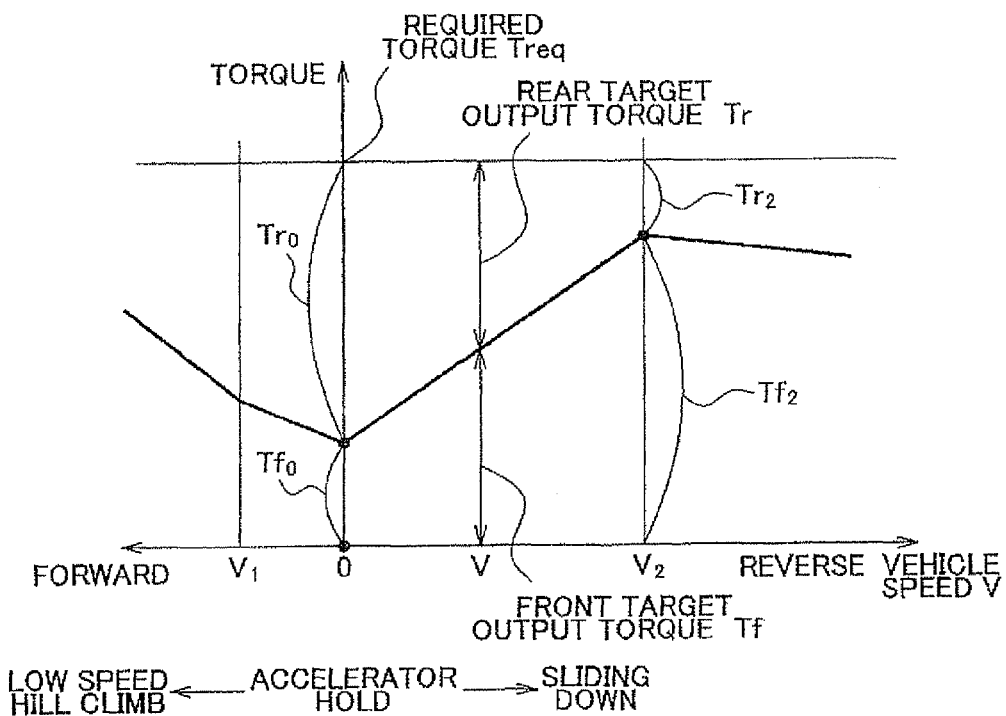
FIG. 2A is a view of the relationship between torque and the vehicle speed of the hybrid vehicle according to the example embodiment of the invention.

Next, the operation of the hybrid vehicle 100 structured as described above will be described with reference to FIGS. 2A to 4. When traveling at extremely low speeds, the hybrid vehicle 100 stops the engine 22, and the front driving wheels 63a and 63b are driven by the synchronous motor 52 and the rear driving wheels 66a and 66b are driven by the induction motor 53. FIG. 2A is a view of the operating state when the vehicle speed of the hybrid vehicle 100 is close to zero and the torque required to drive the vehicle is Treq. This state is what will be referred to as an accelerator hold state in which, while climbing a hill, the hybrid vehicle 100 is stopped midway up the hill by depressing the accelerator so as to balance the backward force applied to the hybrid vehicle 100 against the force in the forward direction from the output of the electric motors 52 and 53. Also, the region to the right of where the vehicle speed V is zero in the drawing shows a state in which the hybrid vehicle 100 is slowly moving backward even though the required torque Treq is being applied in a direction to make the hybrid vehicle 100 go forward, i.e., the hybrid vehicle 100 is sliding down a hill backward even though the accelerator is being depressed. Also, the region to the left of where the vehicle speed V is zero shows a state in which the vehicle speed is extremely low even though the required torque Treq is being applied, such as when the hybrid vehicle 100 is slowly climbing a steep hill while the accelerator is being depressed. Here, to the left of where the vehicle speed V is zero, the velocity is negative. The velocity becomes smaller as the vehicle speed V shifts farther to the left. Incidentally, in this specification, the vehicle speed V is indicated by an absolute value, and the vector is defined case by case.

Figure 2B:
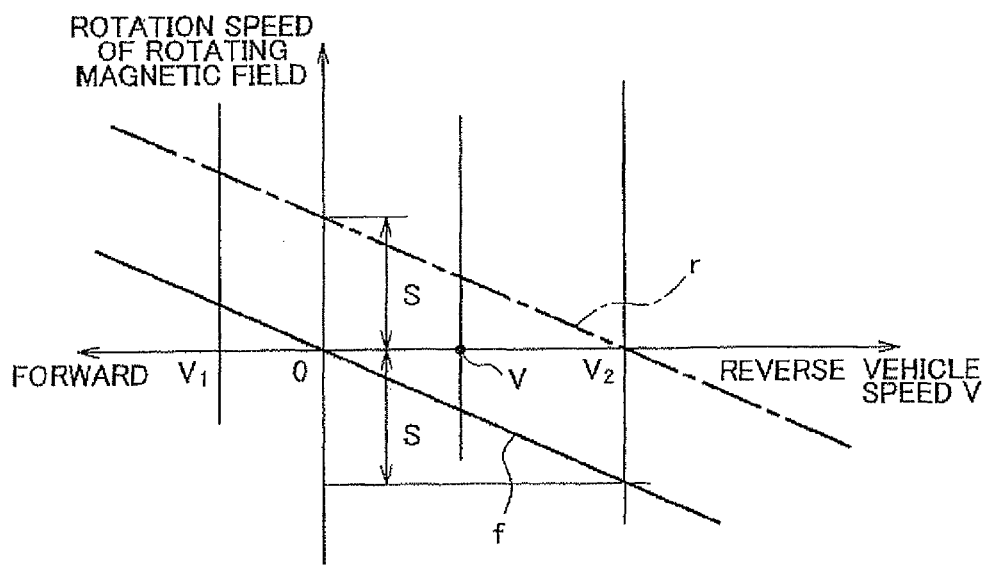
FIG. 2B is a view of the relationship between the rotation speed of a rotating magnetic field of an electric motor and the vehicle speed of the hybrid vehicle according to the example embodiment of the invention.
Figure 3A:
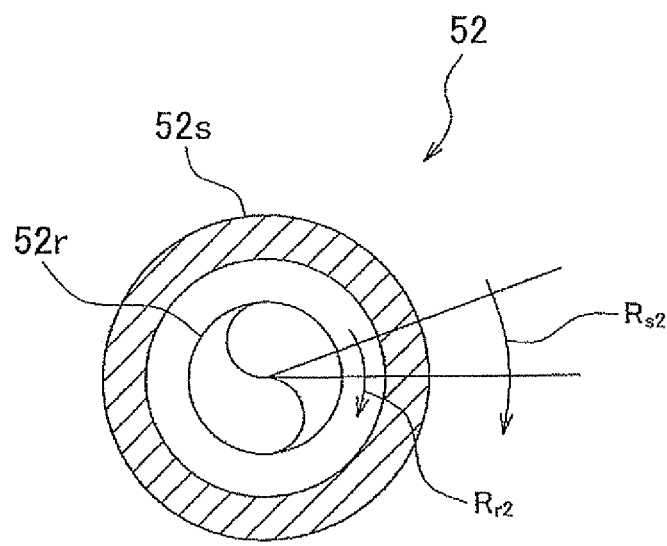
FIG. 3A is a view of the relationship between the rotation speed of a rotating magnetic field of a stator of a synchronous motor and the rotation speed of a rotor of the synchronous motor.

As shown in FIG. 3A, with the synchronous motor 52, a rotor 52r to which permanent magnets are attached rotates at a rotation speed Rr2 that is the same as the rotation speed Rs2 of the rotating magnetic field generated in a stator 52s by the AC power. As shown in FIG. 1, the rotating shaft 48 of the synchronous motor 52 outputs rotation to the front driving wheels 63a and 63b of the hybrid vehicle 100 via the reduction gear 35, the ring gear shaft 32a, the front gear mechanism 60, and the front differential gear 62. As shown by the solid line f in FIG. 2B, the rotation speed Rs2 of the rotating magnetic field generated in the stator 52s of the synchronous motor 52 is proportional to the vehicle speed of the hybrid vehicle 100. If the vehicle speed V of the hybrid vehicle 100 becomes zero, the rotation speed Rs2 of the rotating magnetic field of the synchronous motor 52 also becomes substantially zero. Therefore, the frequency of the three-phase AC power supplied to the synchronous motor 52 becomes zero, and in the first inverter 41 that supplies the three-phase AC power to the synchronous motor 52, the switching element of a given phase is kept on and the temperature of that switching element will rise. However, if the hybrid vehicle 100 slides down, the rotating shaft 48 of the synchronous motor 52 will rotate in reverse, so the rotating magnetic field of the stator 52s will also rotate in reverse. Therefore, the switching element of a given phase of the first inverter 41 will not be kept on and the temperature of that switching element will not rise as it does when the vehicle speed V is zero.

Figure 3B:
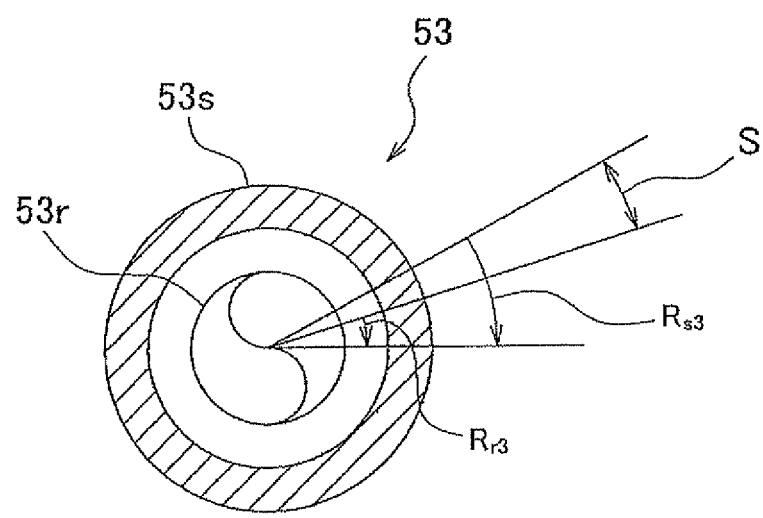
FIG. 3B is a view of the relationship between the rotation speed of a rotating magnetic field of a stator of an induction motor and the rotation speed of a rotor of the induction motor.

Meanwhile, as shown in FIG. 3B, with the induction motor 53, a rotor 53r rotates at a rotation speed Rr3 that is slower than a rotation speed Rs3 of a rotating magnetic field generated in a stator 53s by AC power. The difference between the rotation speed Rs3 of the rotating magnetic field of the induction motor 53 and the rotation speed Rr3 of the rotor 53r is the slip speed S. As shown in FIG. 1, the rotating shaft 49 of the induction motor 53 outputs rotation to the rear driving wheels 66a and 66b of the hybrid vehicle 100 via the rear gear mechanism 65 and the rear differential gear 67. Therefore, the rotation speed Rs3 of the rotating magnetic field generated in the stator 53s of the induction motor 53 is a rotation speed that is faster, by the amount of the slip speed S, than the rotation speed Rr3 of the rotor 53r that corresponds to the vehicle speed of the hybrid vehicle 100, as shown by the alternate long and short dash line r in FIG. 2B. Therefore, even if the vehicle speed V of the hybrid vehicle 100 is zero, the frequency of the three-phase AC power supplied to the stator 53s of the induction motor 53 is higher by the amount of the slip speed S, and will thus not become zero, so in the second inverter 42 that supplies the three-phase AC power to the induction motor 53, the switching element of one phase will not be kept on so the temperature of that switching element will not rise, just as in the first inverter 41. Incidentally, if the rotating shaft 49 of the induction motor 53 starts to rotate in reverse due to the hybrid vehicle 100 sliding down, the rotation speed of the rotating magnetic field of the stator 53s will gradually decrease. Also, if the rotor 53r rotates in reverse at a rotation speed that is equal to the slip speed S, the rotation speed Rs3 of the rotating magnetic field of the stator 53s will become zero. Therefore, if the vehicle speed V comes to be a vehicle speed $V_2$ at which the rotation speed Rr3 of the rotor 53r in the reverse direction is equal to the slip speed S, as shown by the alternate long and short dash line r in FIG. 2B, the frequency of the three-phase AC power that is supplied to the induction motor 53 will become zero, so in the second inverter 42 that supplies the three-phase AC power to the induction motor 53, the switching element of a given phase will be kept on and the temperature of that switching element will rise.

As described above, in the hybrid vehicle 100 in this example embodiment, in an accelerator hold state, the switching element of one phase of the first inverter 41 that supplies three-phase AC power to the synchronous motor 52 is kept on, so the temperature of that switching element rises. If the vehicle speed V becomes a vehicle speed $V_2$ at which the rotation speed Rr3 of the rotor 53r of the induction motor 53 is equal to the slip speed S, the switching element of one phase of the second inverter 42 that supplies three-phase AC power to the induction motor 53 is kept on, so the temperature of that switching element will rise. Therefore, in the hybrid vehicle 100 of this example embodiment, as shown in FIG. 2A, a rise in temperature of the switching elements of the inverters 41 and 42 is suppressed by changing the ratio of the output torque of the synchronous motor 52 that drives the front driving wheels 63a and 63b, i.e., the front output torque Tf, to the output torque of the induction motor 53 that drives the rear driving wheels 66a and 66b, i.e., the rear output torque Tr, according to the vehicle speed V.

Hereinafter, an example of a control operation of the control portion 70 will be described. The control portion 70 obtains a signal indicative of whether the shift position SP is a forward position or a reverse position from the shift position sensor 82. If the shift position SP is a forward position, the control portion 70 calculates the required torque Treq necessary to drive the hybrid vehicle 100 from the accelerator operation amount Ace obtained by the accelerator pedal position sensor 84 and the like, as shown in block 201 in FIG. 4. Also, the control portion 70 obtains the vehicle speed V from the vehicle speed sensor 88, as shown in block 202 in FIG. 4. Then the control portion 70 sets a front target output torque Tf' and a rear target output torque Tr' referencing a map stored in the ROM 72, as shown in block 203 in FIG. 4. The map is used to i) divide the required torque Treq into a ratio $Tr_0:Tf_0$ in which the rear target output torque Tr' is greater than the front target output torque Tf' when the vehicle speed V is zero, ii) divide the required torque Treq into a ratio $Tr_2:Tf_2$ in which the rear target output torque Tr' is less than the front target output torque Tf' when the vehicle speed V is a vehicle speed $V_2$ at which the rotation speed Rr3 of the rotor 53r of the induction motor 53 in the reverse direction is equal to the slip speed S, and iii) continuously change the ratio of the rear output target torque Tr' to the front target output torque Tf' in proportion to the vehicle speed from $Tr_0:Tf_0$ toward $Tr_2:Tf_2$ when the vehicle speed V is between zero and the vehicle speed $V_2$, as shown in FIG. 2A. As shown in FIG. 2A, when the vehicle speed V is zero and the required torque Treq is constant, the front target output torque Tf' becomes a minimum value $Tf_0$, and the rear target output torque Tr' becomes a maximum value $Tr_0$. Conversely, when the vehicle speed V is the vehicle speed $V_2$, the front target output torque Tf' becomes a maximum value $Tf_2$, and the rear target output torque Tr' becomes a minimum value $Tr_2$. The control portion 70 increases and decreases the current output to the synchronous motor 52 and the induction motor 53 from the first inverter 41 and the second inverter 42, respectively, according to the front target output torque Tf' and the rear target output torque Tr'.

Therefore, if the vehicle speed V is zero, at which the frequency of the AC power supplied to the synchronous motor 52 that drives the front driving wheels 63a and 63b becomes zero, the current that flows to the switching element of the first inverter 41 is reduced so a rise in temperature of that switching element is suppressed. If the vehicle speed V is the vehicle speed $V_2$, at which the frequency of the AC power supplied to the induction motor 53 that drives the rear driving wheels 66a and 66b becomes zero, the current that flows to the switching element of the second inverter 42 is reduced so a rise in temperature of that switching element is suppressed. Therefore, even if the hybrid vehicle 100 is in the accelerator hold state or is sliding down, a rise in temperature of the switching elements of the inverters 41 and 42 can be effectively suppressed.

In this example embodiment, the front target output torque Tf' when the vehicle speed V is zero need only be smaller than the rear target output torque Tr'. The front target output torque Tf' may also be zero. In this case, in the accelerator hold state, the current output from the first inverter 41 is zero so the synchronous motor 52 is not driven. Therefore, only the rear driving wheels 66a and 66b are driven by the induction motor 53. Also, conversely, the rear target output torque Tr' when the vehicle speed V is the vehicle speed $V_2$ need only be less than the front target output torque Tf'. The rear target output torque Tr' may also be zero. In this case, when the hybrid vehicle 100 is sliding down, the current output from the second inverter 42 is zero so the induction motor 53 is not driven. Therefore, only the front driving wheels 63a and 63b are driven by the synchronous motor 52.

In this example embodiment, if the vehicle speed V is equal to or greater than $V_1$ indicated in FIGS. 2A and 2B (i.e., to the left of $V_1$ in the drawings), the control portion 70 determines that the hybrid vehicle 100 is not in the accelerator hold state and that the rise in temperature of the switching element of the first inverter 41 is within the allowable range, and shifts from control to set the ratio of the front target output torque Tf' to the rear target output torque Tr' to control to achieve optimum fuel efficiency based on a driving operation by the driver. The same is also true if the vehicle speed V when the hybrid vehicle 100 is sliding down is equal to or greater than $V_2$ (i.e., to the right of $V_2$ in the drawings).

Further, in the example embodiment described above, a case is described in which a map that divides the required torque Treq into the rear target output torque Tr' and the front target output torque Tf' according to the vehicle speed V is used. However, instead of the vehicle speed V, the rotation speed of the synchronous motor 52 or the induction motor 53 may be detected by the rotor position detecting sensor 45 or 46 of the synchronous motor 52 or the induction motor 53, respectively, and a map that divides the required torque Treq into the rear target output torque Tr' and the front target output torque Tf' according to this rotation speed may be used.

Next, another example embodiment of the invention will be described with reference to FIGS. 5 and 6A to 6C. In this example embodiment, the front target output torque Tf' and the rear target output torque Tr' set according to the vehicle speed V, just as in the example embodiment described above, are corrected according to the voltages input to the first inverter 41 and the second inverter 42 and then reset, and the currents output from the first inverter 41 and the second inverter 42 are increased and decreased according to the reset front target output torque Tf' and the reset rear target output torque Tr'.

Figure 6A:
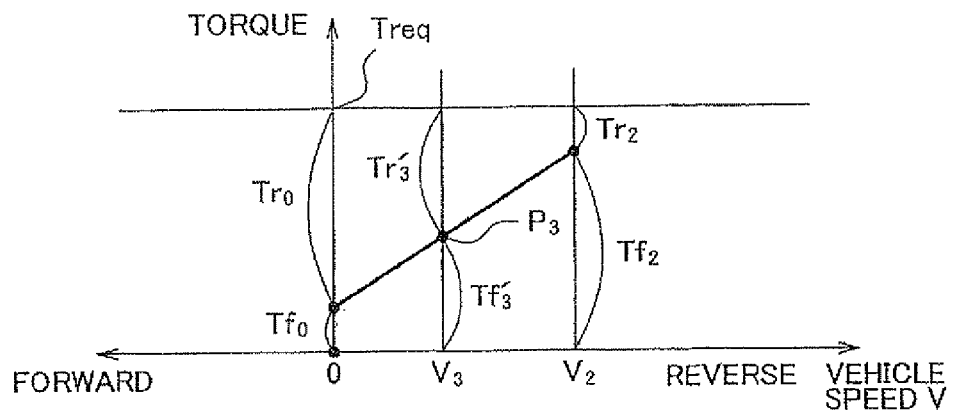
FIGS. 6A to 6C are graphs showing the relationship between torque and vehicle speed of the hybrid vehicle according to the other example embodiment of the invention.
Figure 6B:
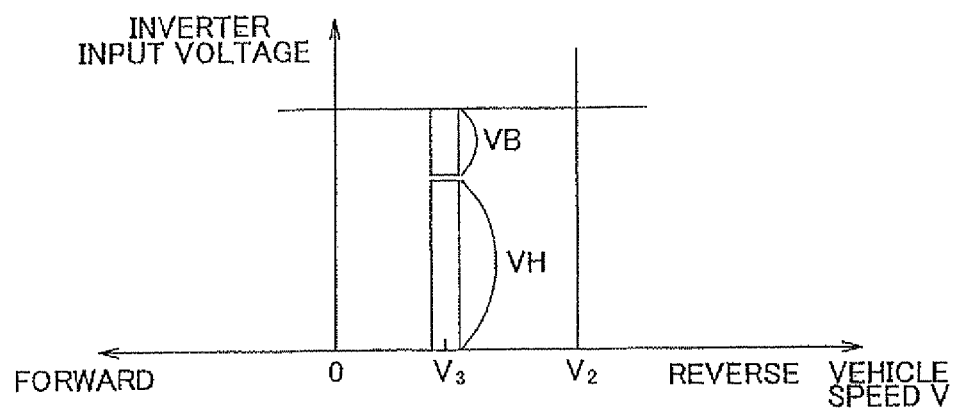
Figure 6C:
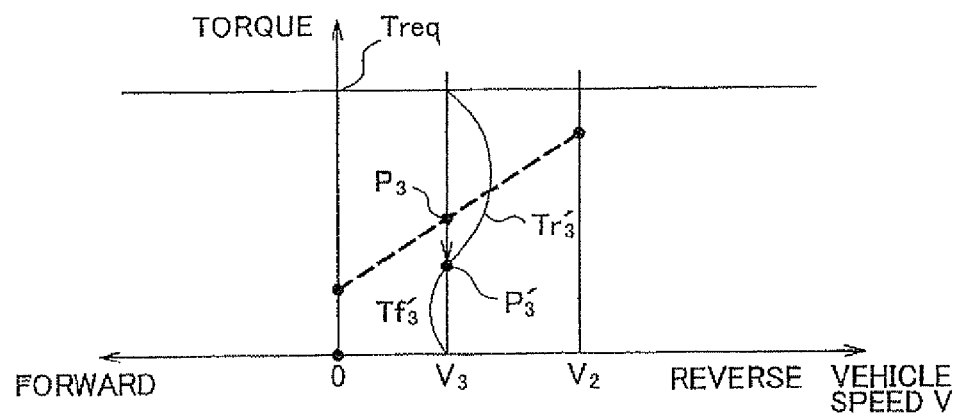

The control portion 70 sets the front target output torque Tf' and the rear target output torque Tr' based on the required torque Treq and the vehicle speed V as shown in blocks 301 to 303 in FIG. 5, just as in the example embodiment described above. For example, if the vehicle speed V is $V_3$, the control portion 70 sets front target output torque Tf' to $Tf_3$' and sets the rear target output torque Tr' to $Tr_3$', as shown in FIG. 6A. Next, the control portion 70 obtains the stepped up voltage VH to be input to the first inverter 41 from the voltage sensor 56 shown in FIG. 1, as shown in block 306 in FIG. 5, and obtains the voltage VB to be input to the second inverter 42 from the voltage sensor 55 shown in FIG. 1, as shown in block 307 in FIG. 5. As shown in FIG. 6B, the control portion 70 calculates a correction coefficient Kf for the front target output torque $Tf_3$' from the voltage VH and the voltage VB according to Expression 1, and calculates a correction coefficient Kr for the rear target output torque $Tr_3$' from the voltage VH and the voltage VB according to Expression 2. Then, as shown in FIG. 5, the control portion 70 corrects the target torques by multiplying the set front target output torque $Tf_3$' and the set rear target output torque $Tr_3$' by the correction coefficients Kf and Kr, respectively. As a result of these corrections, the front target output torque $Tf_3$' becomes smaller than the initially set front target output torque $Tf_3$', and the rear target output torque $Tr_3$' becomes larger than the initially set rear target output torque $Tr_3$', such that the dividing point $P_3$ between the front target output torque $Tf_3$' and the rear target output torque $Tr_3$' shown in FIG. 6A changes to the dividing point $P_3$' between the front target output torque $Tf_3$' and the rear target output torque $Tr_3$' shown in FIG. 6C. Then the control portion 70 increases and decreases the currents output from the first inverter 41 and the second inverter 42 according to the corrected front target output torque $Tf_3$' and the corrected rear target output torque $Tr_3$'. This calculation is performed by output torque changing means 74.

$$Kf=VB/(VH+VB) \qquad \text{(Expression 1)}$$

$$Kr=VH/(VH+VB) \qquad \text{(Expression 2)}$$

As a result, a rise in temperature of the switching elements can be more effectively suppressed by increasing the percentage of the output current of the second inverter 42 in which the input voltage is the low voltage VB and the switching loss of the switching element is small, and decreasing the percentage of the output current of the first inverter 41 in which the input voltage is the stepped up voltage VH and the switching loss of the switching element is large.

In this example embodiment, the correction coefficients Kf and Kr are calculated according to Expressions 1 and 2, respectively. Alternatively, however, a map of correction coefficients may be stored in the ROM 72, and the correction coefficients Kf and Kr may be set from this map.

Next, yet another example embodiment of the invention will be described with reference to FIG. 7. In this example embodiment, the front target output torque Tf' and the rear target output torque Tr' set according to the vehicle speed V, just as in the example embodiment described above with reference to FIGS. 1 to 4, are corrected according to the temperatures of the switching elements of the first inverter 41 and the second inverter 42 and then reset, and the currents output from the first inverter 41 and the second inverter 42 are increased and decreased according to the reset front target output torque Tf' and the reset rear target output torque Tr'.

The control portion 70 sets the front target output torque Tf' and the rear target output torque Tr' based on the required torque Treq, the vehicle speed V, and a map, as shown in blocks 401 to 403 in FIG. 7, just as in the example embodiment described above. Next, the control portion 70 obtains the temperature of the switching element of the first inverter 41, as shown in block 407 in FIG. 7, and calculates a temperature difference ΔTf between the obtained temperature and an upper limit temperature of the switching element of the first inverter 41 shown in block 406, and then outputs the temperature difference ΔTf to block 408. Also, the control portion 70 obtains the temperature of the switching element of the second inverter 42, as shown in block 410 in FIG. 7, and calculates a temperature difference ΔTr between the obtained temperature and an upper limit temperature of the switching element of the second inverter 42 shown in block 409, and then outputs the temperature difference ΔTr to block 411. The control portion 70 also calculates the sum of the calculated temperature differences ΔTf and ΔTr (i.e., ΔTf+ΔTr) and outputs the result to blocks 408 and 411. Then the control portion 70 calculates the correction coefficient Kf for the front target output torque $Tf_3'$ from the temperature difference ΔTf and (ΔTf+ΔTr) according to Expression 3, and calculates the correction coefficient Kr for the rear target output torque $Tr_3'$ from the temperature difference ΔTr and (ΔTf+ΔTr) according to Expression 4, as shown in blocks 408 and 411. Next, the control portion 70 corrects the target torques by multiplying the front target output torque $Tf_3'$ and the rear target output torque $Tr_3'$ by the correction coefficients Kr and Kr, respectively, as shown in FIG. 7. As a result of these corrections, the target output torque in which the difference between the temperature of the switching element and the upper limit temperature is smaller can be decreased, and the target output torque in which the difference between the temperature of the switching element and the upper limit temperature is larger can be increased. Therefore, in this example embodiment, an increase in the temperatures of the switching elements can be suppressed. Also, the temperature of a switching element of an inverter can be inhibited from increasing by evening out the temperature increases in the switching elements, which can be accomplished by decreasing the current output from an inverter with a switching element of a temperature that has risen to close to the upper limit temperature, and increasing the current output from an inverter with a switching element of a temperature that still has a ways to go before it reaches the upper limit temperature. This calculation is performed by the output torque changing means 74.

$$Kf=\Delta Tf/(\Delta Tf+\Delta Tr) \quad \text{(Expression 3)}$$

$$Kr=\Delta Tr/(\Delta Tf+\Delta Tr) \quad \text{(Expression 4)}$$

In this example embodiment, the front target output torque Tf' and the rear target output torque Tr' set according to the vehicle speed V are corrected according to the temperatures of the switching elements of the first inverter 41 and the second inverter 42 and then reset. Alternatively, however, the front target output torque Tf' and the rear target output torque Tr' set according to the vehicle speed V may be further corrected by also being multiplied by correction coefficients calculated based on the input voltages of the inverters 41 and 42, as in the example embodiment described above with reference to FIGS. 5 and 6A to 6C.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. An electric vehicle comprising:
   a synchronous electric motor that outputs torque to a first driving wheel;
   an induction electric motor that outputs torque to a second driving wheel;
   a first inverter that converts first direct current power to alternating current power for driving the synchronous electric motor;
   a second inverter that converts second direct current power to alternating current power for driving the induction electric motor;
   a vehicle speed sensor that detects a vehicle speed; and
   a control portion that controls the torque output from the synchronous electric motor and the torque output from the induction electric motor,
   wherein the control portion includes an output torque changing portion that makes the torque output from the synchronous electric motor smaller than the torque output from the induction electric motor when torque is output to the first driving wheel or the second driving wheel and the vehicle speed is close to zero, and that makes the torque output from the synchronous electric motor larger than the torque output from the induction electric motor when torque is output to the first driving wheel or the second driving wheel and the vehicle is moving at or greater than a predetermined speed in a direction opposite a direction in which the vehicle is being operated to move, by the torque output to the first driving wheel and the second driving wheel.

2. The electric vehicle according to claim 1, wherein the predetermined speed is a speed at which a rotation speed of a rotating magnetic field generated in a stator of the induction electric motor is close to zero; and the output torque changing portion of the control portion increases the torque output from the synchronous electric motor and decreases the torque output from the induction electric motor, according to a change in the vehicle speed from close to zero toward the predetermined speed.

3. The electric vehicle according to claim 2, wherein the output torque changing portion of the control portion changes a ratio of the torque output from the synchronous electric motor to the torque output from the induction electric motor according to a ratio of a first voltage of the first direct current power to a second voltage of the second direct current power.

4. The electric vehicle according to claim 3, wherein the first inverter includes a first switching element; the second inverter includes a second switching element; and the output torque changing portion of the control portion changes a ratio of the torque output from the synchronous electric motor to the torque output from the induction electric motor according to a temperature of the first switching element and a temperature of the second switching element.

5. The electric vehicle according to claim 4, wherein the output torque changing portion of the control portion sets a target output torque for the synchronous electric motor and a target output torque for the induction electric motor based on a map in which a ratio of the torque output from the synchronous electric motor to the torque output from the induction electric motor with respect to the vehicle speed has been set beforehand, and then corrects the torque output from the synchronous electric motor and the torque output from the induction electric motor according to i) the ratio of the first voltage of the first direct current power to the second voltage of the second direct current power, or ii) the temperature of the first switching element and the temperature of the second switching element; and the output torque changing portion of the control portion resets the corrected target output torque for the synchronous electric motor and the corrected target output torque for the induction electric motor.

6. The electric vehicle according to claim 1, wherein movement in the direction in which the vehicle is being operated to move is associated with a negative velocity; movement in the direction opposite the direction in which the vehicle is being operated to move is associated with a positive velocity; and the predetermined speed is a positive value.

7. The electric vehicle according to claim 1, wherein the direction in which the vehicle is being operated to move is an uphill.

8. The electric vehicle according to claim 1, wherein the first driving wheel is a front wheel of the vehicle; and the second driving wheel is a rear wheel of the vehicle.

* * * * *